United States Patent
Guthrie, II.

(10) Patent No.: US 7,225,210 B2
(45) Date of Patent: May 29, 2007

(54) BLOCK LEVEL DATA SNAPSHOT SYSTEM AND METHOD

(75) Inventor: John L. Guthrie, II., Monroe, WA (US)

(73) Assignee: Overland Storage, Inc., San Diego, CA (US)

( * ) Notice: Subject to any disclaimer, the term of this patent is extended or adjusted under 35 U.S.C. 154(b) by 453 days.

(21) Appl. No.: 10/718,486

(22) Filed: Nov. 20, 2003

(65) Prior Publication Data

US 2005/0114402 A1    May 26, 2005

(51) Int. Cl.
G06F 17/30    (2006.01)
(52) U.S. Cl. ...................................... 707/205
(58) Field of Classification Search ............ 707/1, 707/2, 9, 10, 205; 709/219; 711/113
See application file for complete search history.

(56) References Cited

U.S. PATENT DOCUMENTS

| | | | |
|---|---|---|---|
| 5,819,292 | A | 10/1998 | Hitz et al. |
| 6,311,193 | B1 | 10/2001 | Sekido |
| 6,959,310 | B2 | 10/2005 | Eshel et al. |
| 6,959,313 | B2 | 10/2005 | Kapoor et al. |
| 2002/0129123 | A1 * | 9/2002 | Johnson et al. ............. 709/219 |
| 2002/0152354 | A1 * | 10/2002 | Harmer ....................... 711/113 |
| 2003/0014207 | A1 * | 1/2003 | Arnaout et al. ............. 702/119 |
| 2003/0051109 | A1 * | 3/2003 | Cochran ..................... 711/162 |
| 2003/0182317 | A1 * | 9/2003 | Kahn et al. ................. 707/200 |
| 2004/0019706 | A1 * | 1/2004 | Smith ............................ 710/1 |
| 2005/0010592 | A1 | 1/2005 | Guthrie |
| 2005/0027819 | A1 | 2/2005 | Nakano et al. |
| 2005/0138312 | A1 | 6/2005 | Kubo et al. |
| 2005/0216535 | A1 | 9/2005 | Saika et al. |
| 2005/0240803 | A1 | 10/2005 | Saika et al. |

* cited by examiner

*Primary Examiner*—Etienne LeRoux
(74) *Attorney, Agent, or Firm*—Knobbe Martens Olson & Bear LLP

(57) ABSTRACT

A block level data snapshot system uses agents to convert block level file commands from devices such as computer workstations intended for block level devices such as hard disks. The block level file commands are converted into instructions for a node based snapshot data system for taking snapshots at the block level. By converting the block level file commands into instructions suitable for the node based snapshot system, snapshots are able to be taken at the block level, which allows for disk storage savings and speed enhancements. One resultant feature is that the block level data snapshot system can be used as a block level storage device for one or more workstations thus allowing relatively simple integration of a snapshot system with existing workstations.

24 Claims, 15 Drawing Sheets

Fig. 9A

|   | AS | BY |
|---|----|----|
| 1 | 2  | 4  |
| 2 | 3  | 1  |
| 3 | 4  | 2  |
| 4 | 1  | 3  |

|   | AS | BY |
|---|----|----|
| 1 | 3  | 4  |
| 2 | 0  | 0  |
| 3 | 4  | 1  |
| 4 | 1  | 3  |

| 2 | 3 | 1 |
|---|---|---|

| 3 | 4 | 1 |
|---|---|---|

| 1 | 3 | 3 |
|---|---|---|

| 3 | 4 | 2 |
|---|---|---|

| 1 | 3 | 4 |
|---|---|---|

| 4 | 0 | 0 |
|---|---|---|

| 4 | 1 | 3 |
|---|---|---|

| 1 | 2 | 4 |
|---|---|---|

605

| 4 | 1 | 3 |
|---|---|---|

| 2 | 0 | 0 |
|---|---|---|

606

| 3 | 1 | 1 |
|---|---|---|

| 2 | 0 | 0 |
|---|---|---|

BLOCK LEVEL DATA SNAPSHOT SYSTEM AND METHOD

BACKGROUND OF THE INVENTION

1. Field of the Invention

The present invention is directed generally to creating a snapshot of data.

2. Description of the Related Art

Conventional approaches have been used to create snapshots of file system data that represent the state of the data at the time the snapshot was taken. Consequently, snapshots are static in that they do not change as the underlying file system data changes. Their utility has been proven in areas for backup and recovery of file system data and in tracking changes to data that occur over a period of time.

Conventional approaches are able to take snapshots without having to copy all the file system data thus drastically reducing storage requirements. Unfortunately, these conventional approaches typically copy all the directory information of the file system as part of the snapshot. This directory information by itself can be very large thereby lowering system performance and increasing storage requirements. More recent approaches have been able to reduce the amount of directory information required for each snapshot, however, these approaches still focus on the file level whereas much of the time, modifications do not occur on entire files but rather on portions of the files.

BRIEF SUMMARY OF THE INVENTION

The present invention resides in a block level data snapshot system and method. Embodiments include an initiator including a directory of files, each of the files containing data apportioned into blocks of data; a first block level hardware interface; a first block level communication interface configured to transmit and receive the blocks of data via the first block level hardware interface; a storage containing data segregated into nodes; and a snapshot server including: a node level hardware interface communicatively linked with the storage; a second block level hardware interface communicatively linked to the first block level hardware interface of the initiator; a second block level communication interface configured to exchange blocks of data with the initiator via the second block level hardware interface; a node level snapshot management configured to generate snapshots of the nodes of data contained in the storage; and an agent associated with the directory of files, the agent configured to translate first blocks of data received from the initiator into corresponding first nodes of data to be sent via the node level hardware interface to the storage, the agent configured to translate second nodes of data received from the storage into corresponding second blocks of data to be sent to the initiator.

Other features and advantages of the invention will become apparent from the following detailed description, taken in conjunction with the accompanying drawings.

BRIEF DESCRIPTION OF THE SEVERAL VIEWS OF THE DRAWING(S)

FIGS. 9A and 9B illustrate the setting of the aliased as and aliased by fields in one embodiment.

DETAILED DESCRIPTION OF THE INVENTION

Generally, directories are a hierarchical collection of files and files are made up of blocks of data. Conventionally, these files are saved, retrieved, modified, and deleted by manipulation at the block level. Unfortunately, conventional approaches for taking snapshots of files are at the file and directory level rather than the block level. As will be discussed in greater detail herein, a block level data snapshot system uses agents to convert block level file commands from devices such as computer workstations intended for block level devices such as hard disks.

The block level file commands are converted into instructions for a node based snapshot data system that up until the present invention was used for taking snapshots at the file and directory level rather than at the block level. By converting the block level file commands into instructions suitable for the node based snapshot system, snapshots are able to be taken at the block level, which allows for disk storage savings and speed enhancements. One resultant feature is that the block level data snapshot system can be used as a block level storage device for one or more workstations thus allowing relatively simple integration of a snapshot system with existing workstations. This and other features will become apparent from the discussion below.

Figure 1:
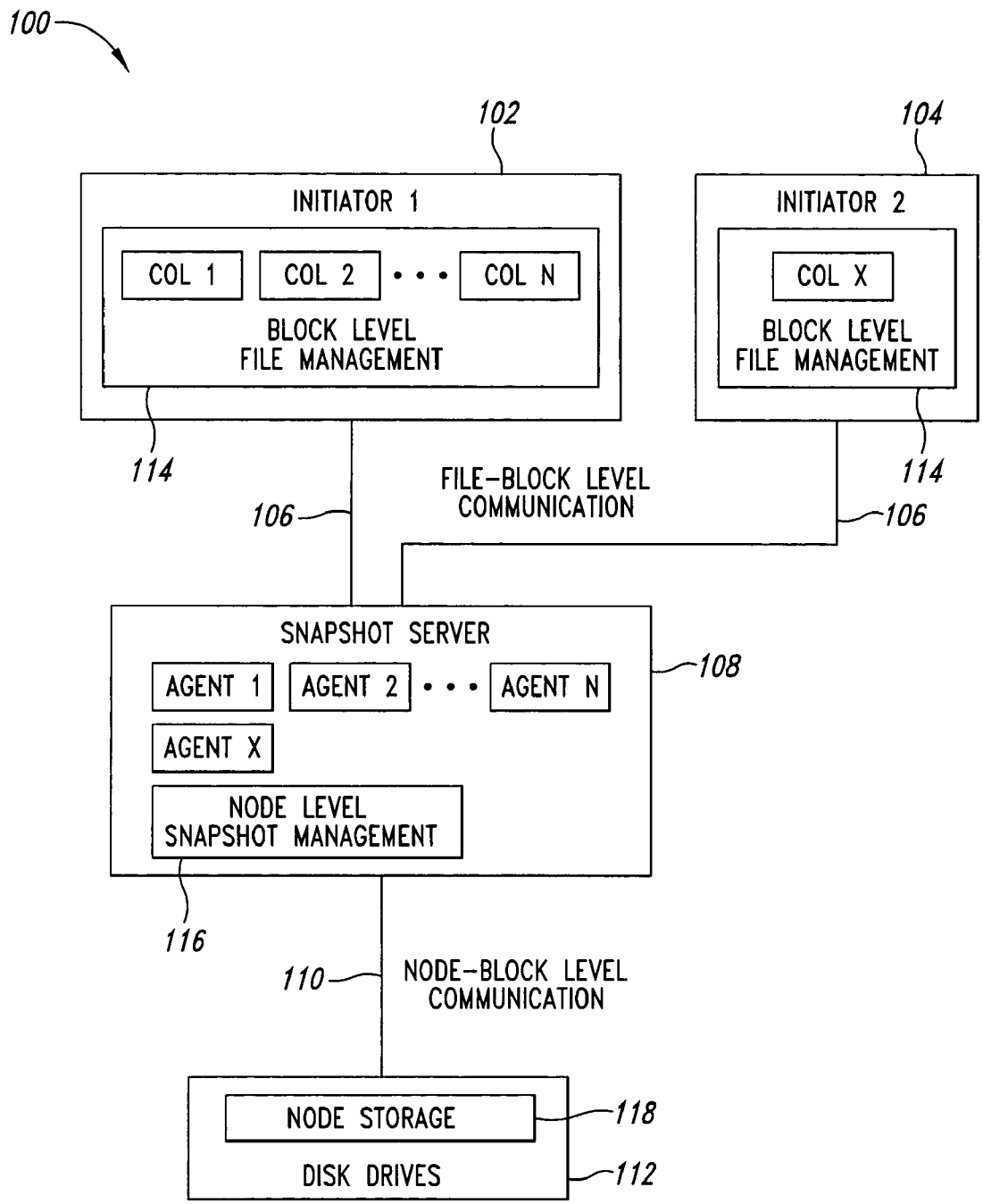
FIG. 1 is a schematic diagram of an implementation of a block level data snapshot system according to the present invention.

An implementation of a block level data snapshot system 100 according to the present invention is depicted in FIG. 1 as having initiators 102 and 104 communicatively linked via file-block level communication 106 with a snapshot server 108. The snapshot server 108 is communicatively linked via node-block level communication 110 to a disk drives 112.

The initiators 102 and 104 are typically workstations, but can be other devices either for user operation or automated for unattended operation that use file and directory based hierarchical information systems conventionally known. In the depicted implementation, the initiator 102 contains a plurality of file collections (one, two, . . . N) whereas the initiator 104 contains a single collection (X) used in block level file management 114. The block level file management 114 pertains to conventional manipulation of files directed to one or more blocks of data contained in a file such as for saving, retrieving, modifying, copying, and deleting the file.

The file-block level communication 106 can be any conventional communication means able to transmit blocks of data such as but not limited to small computer communication interface (SCSI), fiber channel, iSCSI, and so on. Unique to the depicted implementation is the correspondence of collections of the initiator 102 with agents of the snapshot server 108 such that collections one, two, . . . N have corresponding agents one, two, . . . N, respectively. Furthermore, collection X of the initiator 104 has a corresponding agent X in the snapshot server 108.

Under various implementations each of the collections depicted could be a file system directory indicated by a directory name (such as with a Unix system that allows for a drive letter to be mounted on a directory) or alternatively could be an individual drive indicated by a drive letter (such as with a Windows system). In general, an individual agent serves to map an individual collection to a physical device (disk, tape, CD-ROM, and so on). Consequently, in other implementations, agents map collections (either implemented as file directories or drive letters) to devices other than or in addition to the disk drives 112.

Correspondence between a collection and an agent means that the agent will perform processes through the snapshot server 108 regarding the disk drives 112 for any file within its corresponding collection. Through the processes discussed in more detail below, the agent typically translates block level instructions sent out by one of the initiators 102 and 104 along with block level data so that a node level snapshot management 116 of the snapshot server 108 will treat each block of data as a node in subsequent snapshot processing.

One resultant feature allows for rapid installations of user accounts by taking a snapshot of a template root directory including all underlying folders and files for each user and setting up a correspondence of a newly created root directory for each user to a particular agent that will be associated with the snapshot. By performing this procedure numerous times, new installations can be accomplished in a relatively short period of time. For this initialization procedure, since each snapshot is associated with an agent that corresponds to a user's root directory, the snapshot is allowed to be modified to accommodate modifications made over time to each user's root directory. As discussed extensively below, the snapshot process copies the root node of a hierarchical organization to a new root node that points to the same child nodes as the copied root node. By allowing for subsequent modification of a snapshot, it is possible that some nodes may end up having no associated pointers so that corresponding space of a disk drives 112 becomes useless. The node level snapshot management 116 prevents this by monitoring for the condition wherein a non-root node is not being pointed at by any associated pointers. When a node is found that satisfies this condition, the space occupied by the node is made available again for other future use.

Particulars of snapshot processing are extensively discussed further below. Other implementations use other types of correspondence based upon various combinations of collections and files corresponding with designated agents.

The node-block level communication 110 uses conventional communication means for block level communication such as those discussed for the file-block level communication 106 or other communication such as IDE, EIDE, USB, FireWire, and so on. The disk drives 112 contains node storage 118 in accordance with the node level snapshot management 116.

Figure 2:
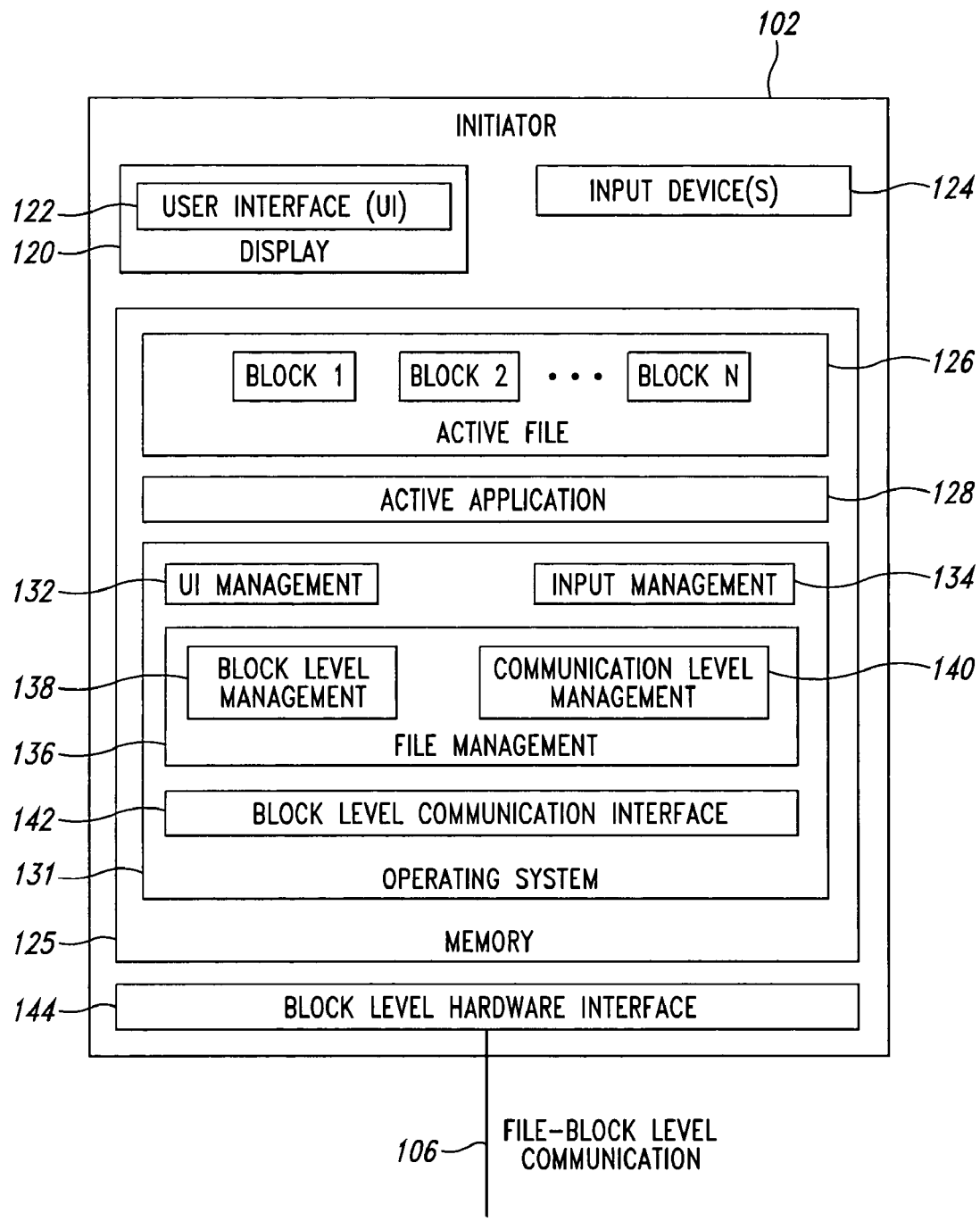
FIG. 2 is a schematic diagram of an implementation of one of the initiators of FIG. 1.

A workstation implementation of the initiator 102 is shown in FIG. 2 as having a display 120 with a user interface (UI) 122, and one or more input devices 124 such as a keyboard, mouse, trackball, and so on. The initiator 102 has a memory 125, which is depicted as containing an active file 126 with blocks one, two, . . . N of data and an active application 128. The memory 125 also contains an operating system 131 such as Windows XP, Linux, another Unix version, or other that has UI management 132 to control the UI 122 and input management 134 to communicate with the input devices 124. The operating system 131 also contains file management 136 with block level management 138 to handle manipulation of individual files and collection level management 140 to handle organization and structure of collections of files.

For instance, a block level communication interface 142 in the operating system 131 works with the block level management 138 to communicate through a block level hardware interface 144 when a particular file needs to be saved, retrieved, modified, deleted, etc., since these file manipulations are typically done on particular one or more blocks of data for the file. Both the block level communication interface 142 and the block level hardware interface 144 can be of a number of conventional interfaces such as a version of SCSI, fiber channel, or others know in the art. In turn, the file-block level communication 106 is comprised of cable and connection hardware according to the particular conventional interface used. In the depicted implementation, the block level communication interface 142 is also used to associate the collections one, two, . . . N of the initiator 102 to corresponding agents one, two, . . . N, respectively, of the snapshot server 108.

Figure 3:
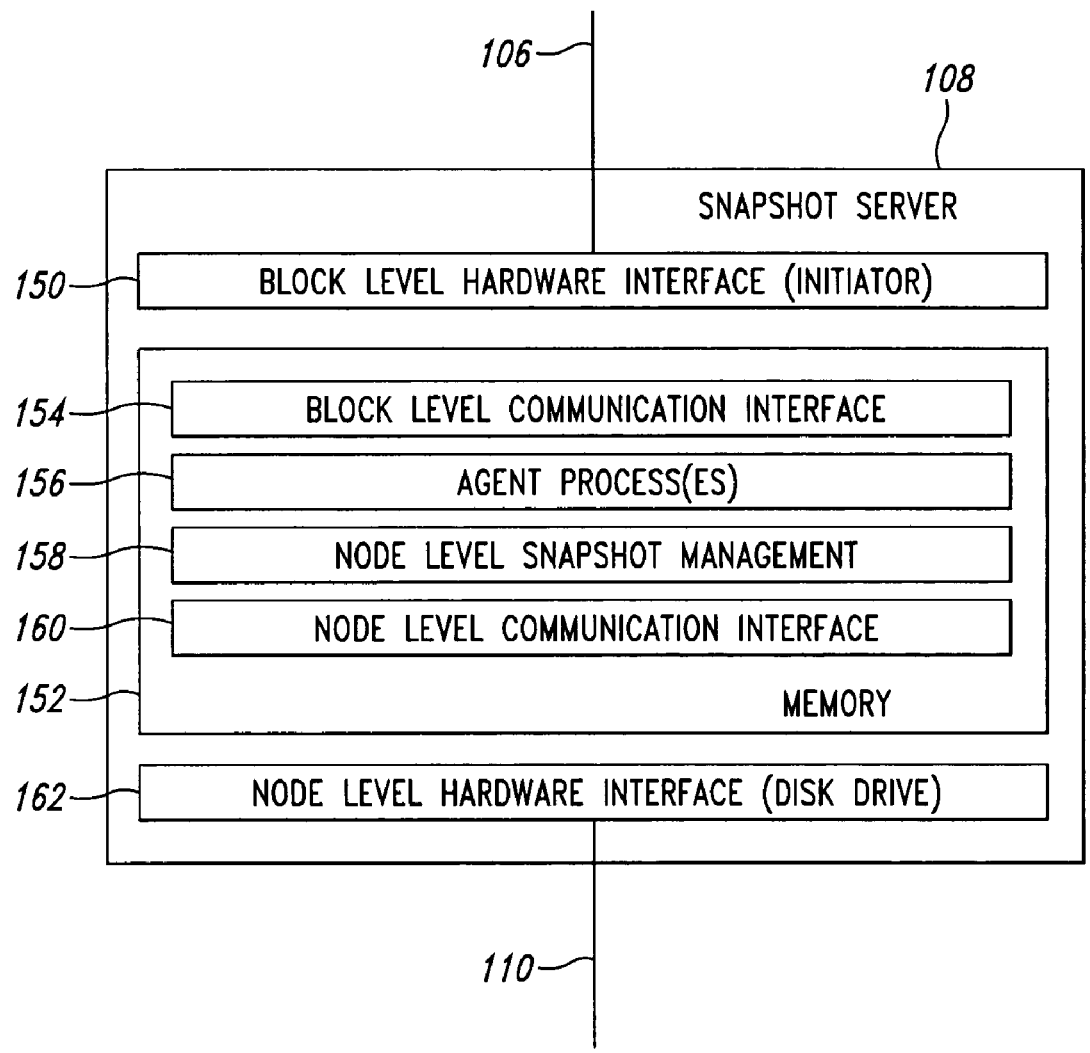
FIG. 3 is a schematic diagram of an implementation of the snapshot server of FIG. 1.

An implementation of the snapshot server 108 is depicted in FIG. 3 as having a block level hardware interface 150 and a memory 152. The block level hardware interface 150 uses the same communication interface standards as the block level hardware interface 144 of the initiator 102. The memory 152 contains a block level communication interface 154 that uses the block level hardware interface 150 to communicate with the initiator 102 using the same communication interface standards as the block level hardware interface.

The memory 152 also contains one or more agent processes 156, which in the depicted implementation are the agent one, agent two, . . . agent N that correspond with the collection one, collection two, . . . collection N of the block level file management 114 of the initiator 102.

The memory 152 further contains node level snapshot management 158 that will be discussed in detail below and a node level communication interface 160 that uses a node level hardware interface 162 having communication interface standards of the disk drives 112 (such as IDE or SCSI) to transmit and receive data from the disk drives according to operations of the node level snapshot management.

Typically, each agent must take block level commands and one or more blocks of data received through the block level hardware interface 150 from the initiator 102 and translate commands and data into a form that can be used by the node level snapshot management 158. In the depicted implementation data are stored in nodes under a naming convention associated with the portion of storage that a node resides such as of a form "terabyte group/gigabyte group/ megabyte group/sub-megabyte group." For example 2/102/ 93/1 would indicate that a particular node would occupy the first portion of the $93^{rd}$ megabyte portion of the $102^{nd}$ gigabyte portion of the $2^{nd}$ terabyte portion of a storage such as the depicted disk drives 112. In practice, translation into the naming convention of the node level snapshot management 158 requires a greater degree of complexity such as illustrated by the following representative translation guidelines:

define offsetHash1(_offset) ((p_offset>>41) & 0x7f)
define offsetHash2(_offset) ((p_offset>>34) & 0x7f)
define offsetHash3(_offset) ((p_offset>>27) & 0x7f)
define offsetHash4(_offset) ((p_offset>>20) & 0x7f)

Given a 64-bit byte offset onto a disk, the following hashes are used to create a path to a 1 MB block. The numbers will be different for different block sizes. The path to a file containing the block data results in:

<Some root directory>/<result of offsetHash1>/<result of offsetHash2>/<result of offsetHash3>/<result of offsetHash4>

Once the block to be read is known, the offset in the node is given by "offset & 0x0fffff." The amount of data to be read from the node is given by "MIN (<amount of data requested>, 0x100000—(offset & 0x0fffff))." These expressions are based upon a 1 MB block and vary dependant upon block size.

As further illustration, for an implementation of the block level hardware interface 150 using the SCSI interface communication standard, general commands would include read, write, query, verify, and error. As depicted, the block level communication interface 142 is configured to associate collection one of the file management 136 of the initiator 102 with the agent one of the agent processes 156 of the snapshot server 108. With SCSI, a different agent is associated with each unique combination of bus, target, and logical unit number. Under normal operation, when the file management 136 of the initiator 102 performs a file operation associated with the collection one, the agent one through the block level communication interface 154 of the snapshot server 108 receives SCSI command-and-control blocks from the block level communication interface 142 of the initiator 102 containing a code header and command dependent and data. The code header indicates which SCSI command is to be associated with the received one or more blocks of data.

With a read command transmission from the initiator 102 to the snapshot server 108, an offset indicating position of the first block of data to be read and an indication of the overall size of the blocks to be read is present. The agent one first converts the received offset into a file path of the first node stored on the disk drives 112 in the form terabyte portion/gigabyte portion/megabyte portion/sub-megabyte portion as discussed above. The offset is then used to determine the offset of the particular node which is the first node of interest on the disk drives 112. The overall size of the blocks of data of interest is then used to determine how many nodes are of interest. Typically, if more than one node is involved a counter will be used to increment the node path such as 2/53/102/3, 2/53/102/4, 2/53/102/5, and so on until a sufficient number of consecutive nodes are received. If a node does not exist on the disc drive 112, the agent one will send back an empty buffer.

If a SCSI write command is received, the agent one will perform similar operations as the read to find the starting point to be used with the particular first node of interest, however, the one or more nodes of interest will then be either created or written over in accordance with the methods described below of the node level snapshot management 158.

To address the SCSI query command, a vendor name, product name, version number, disk size, and sector size can be hard coded and compiled with the operating system (not shown) of the snapshot server 108. Implementations of the snapshot server 108 provide a virtualization feature that allows identification of the disk size to be different than the actual physical size of the disc drive 112. The snapshot server 108 can then include a monitoring process that notifies an operator when occupied space of the disk drives 112 has reached a certain percentage of the total physical size of the disk drives.

With this virtualization feature, an administrator can initially allocate more disk space to a group of users than is actually physically available. When the unused physical space on the disk drives 112 is reduced to a certain degree, the administrator would then be notified by the snapshot server 108 so that the administrator could then add more physical drives to the disk drives 112. For instance, for a group of 100 users, an administrator could initially allocate 80 GB of virtual space for each user even though the disk drives 112 could actually initially have a physical storage capacity far smaller than 8TB. For instance, the initial physical storage capacity of the disk drives could be something like 100 GB. As the 100 GB becomes used, at a certain point, such as when 80 GB are used and only 20 GB remain unused, the snapshot server 108 generates an alert for the administrator to add additional storage space to the disk drives 112. As additional storage is added, the users would not notice any differences and could still plan for a space allocation of 80 GB per user.

For the SCSI verify command, the agent one would typically reply with a "YES" without attempting a verification procedure since under appropriate scenarios, verification has already occurred with the node level hardware interface 162 of the snapshot server 108 and the disk drives 112.

For the SCSI error command, the agent one would reply to the initiator 102 by sending a check condition bit in the on condition to instruct the block level hardware interface 144 of the initiator 102 to check for an error. According to SCSI procedure, the initiator 102 will then ask the snapshot server 108 the nature of the error and the agent one will reply accordingly to inform the initiator.

Node Level Snapshot Management

A method and system for creating a snapshot of data is provided. In one embodiment, the snapshot system creates a snapshot of data that is hierarchically organized, such as the data of a file system. For example, the data may be stored in files and organized by folders or directories. The files and directories are referred to as "nodes." The UNIX file system refers to such nodes as "nodes." When a snapshot is to be created, the snapshot system copies the root node of the hierarchical organization to a new root node that points to the same child nodes as the copied root node. This new root node becomes the root node of the snapshot data. The nodes within the snapshot data are referred to as snapshot nodes, and the nodes within the current data are referred to as the current nodes. When a current node is subsequently modified, the snapshot system replaces each ancestor node of that node that has not yet been replaced with a new node that has the same child nodes as the replaced node. The snapshot system also replaces the node to be modified with a new node that points to the same child nodes of the replaced node. The replaced nodes become snapshot nodes and represent the state of the data at the time the snapshot was taken. In this way, the creating of a snapshot involves minimal copying of node information at the time the snapshot is created and defers the copying or replacing of other nodes until the node or one of its descendent nodes is modified. Moreover, only the nodes that are actually modified and their ancestor nodes are copied. One skilled in the art will appreciate that although the root node is described as being copied when a snapshot is created, that copying can be deferred until the first modification to the data after the snapshot is taken.

In one embodiment, the snapshot system creates and makes available multiple snapshots representing different states of the data at various times. Whenever a new snapshot is created, the snapshot system copies the current root node of the data to a new root node. The copied root node becomes the root node for the snapshot. To keep track of which nodes have been replaced during which snapshots, the snapshot system records information indicating the snapshot during which each node was last modified. For example, a new node may have an attribute that indicates the snapshot at the time the new node was created. Whenever a current node is modified, the snapshot system identifies the highest ancestor node that has not yet been replaced during the current snapshot. The snapshot system then replaces that ancestor node and its descendent nodes down to the node that is being modified. As the nodes are replaced, the snapshot system sets each new node to point to the child nodes of the replaced node. When a node is replaced, its parent node is set to point to the new node. In this way, the replaced nodes that form the snapshot point to current child nodes and to the replaced nodes that are snapshot nodes.

In one embodiment, a node can be marked as to not be part of a snapshot. In such a case, the node and its descendent nodes are not replaced when they are modified. The snapshot system can store an indication in a snapshot identifier field of the node that it is not to be part of a snapshot. When a descendent node is modified, the snapshot system identifies such a node as it looks for the highest ancestor node that has not yet been replaced during the current snapshot. When such an ancestor is identified, the snapshot system performs the requested modification without replacing any nodes.

File systems, such as the UNIX file system, typically assign a unique node identifier to each node, referred to as an "actual identifier" in the following. Application programs accessing the file system are provided with the actual identifier, or a file handle derived from the actual identifier, for use in accessing the node. When the snapshot system replaces a node, the new node has a new actual identifier that is different from the actual identifier of the replaced node. Application programs that had been provided with the actual identifier of the replaced node would then access the replaced node rather than the new node. To prevent this, the snapshot system provides "virtual identifiers" to application programs, rather than the actual identifiers. The snapshot system maintains a mapping (or association) between actual identifiers and virtual identifiers. When an application program requests a handle to a node in the current data, the snapshot system returns to the virtual identifier, rather than the actual identifier. Because the application program has only virtual identifiers, when the application program subsequently attempts to access the current data, it provides a virtual identifier. The snapshot system uses the mapping to find the corresponding actual identifier and directs the access to that node. When a node is first created by file system and it has not yet been replaced by the snapshot system, then the snapshot system uses the actual identifier as the virtual identifier. When the node is replaced, the snapshot system sets the virtual identifier of the replacing node to the virtual identifier of the replaced node. The snapshot system also uses the virtual identifier for the replaced nodes that become part of the snapshot data. The snapshot system sets the virtual identifier of the replaced node to the virtual identifier of the replacing node. When an application program accesses a snapshot node, the snapshot system returns the virtual identifier of that node along with a flag set (e.g., the high order bit of the virtual identifier set) to indicate that the virtual identifier corresponds to a snapshot node. When the application program accesses a node identified by a virtual identifier with the flag set, the snapshot system limits the access to the node as appropriate for a snapshot node (e.g., read only).

Figure 4:
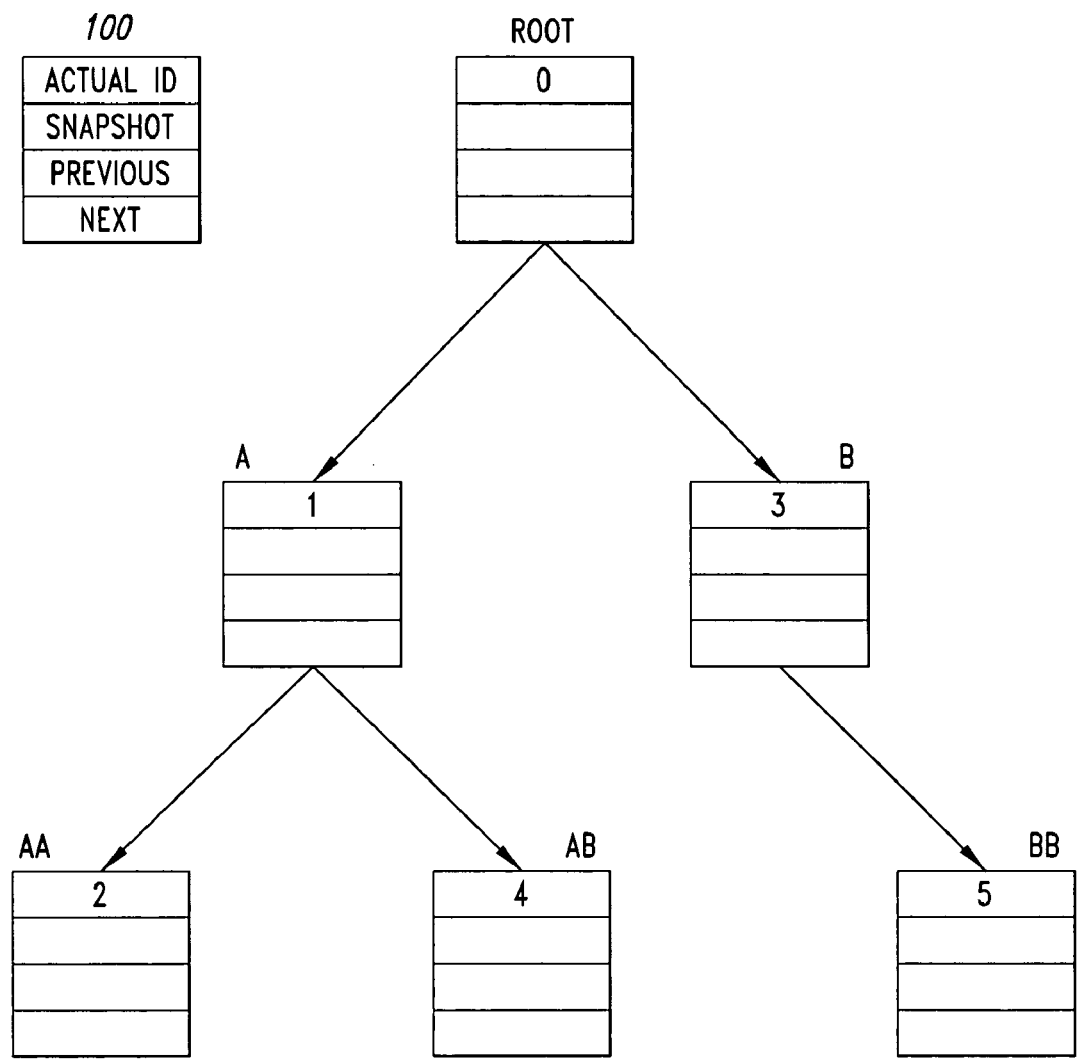
FIG. 4 is a block diagram illustrating data within a hierarchically organized file system in one embodiment.

FIG. 4 is a block diagram illustrating data within a hierarchically organized file system in one embodiment. The nodes of the file system are referred to as current nodes and are uniquely identified by their node identifiers. Template 100 illustrates the fields of the node. As illustrated by template 100, each node includes an actual identifier field, a snapshot identifier field, a previous field, and next field. The node identifier field contains the unique actual identifier assigned by the file system. For example, the root node currently contains the actual identifier 0, and its child nodes contain the actual identifiers 1 and 3. The snapshot identifier fields identifies the current snapshot at the time the node was created to replace an existing node. In this example, since no snapshot has yet been created, all the snapshot identifier fields are blank. The previous and next fields are used to track snapshot nodes representing past versions of a current node. The fields form a doubly linked list. For purposes of illustration, each of the nodes includes an alphabetic identifier. For example, node 2 has the identifier.

"AA." One skilled in the art would appreciate that nodes of a file system would typically contain many more fields such as a reference count or link count field, pointer fields to the data, various attribute fields, and so on.

Figure 5:
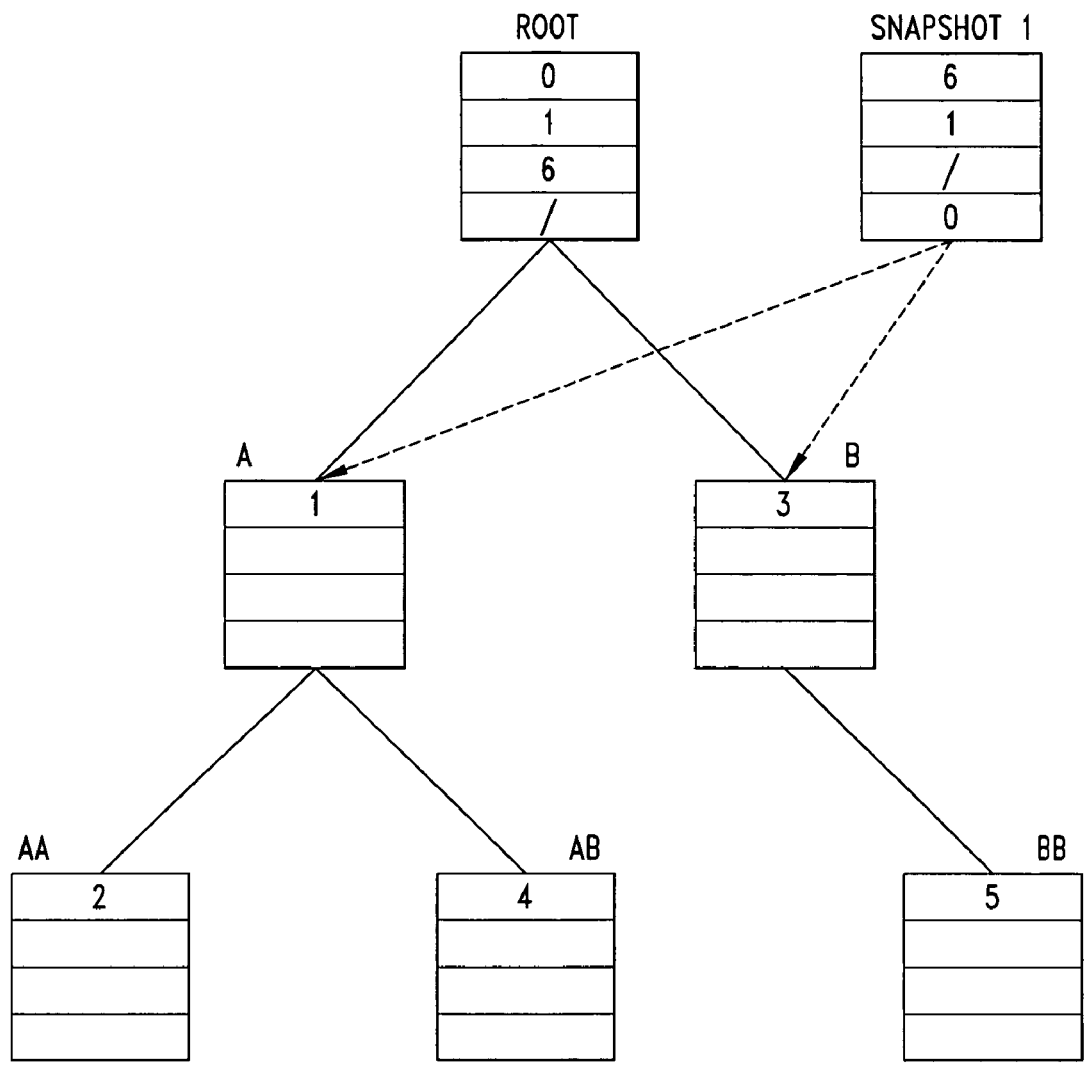
FIG. 5 is a block diagram illustrating data within the hierarchically organized file system after a snapshot has been created in one embodiment.

FIG. 5 is a block diagram illustrating data within the hierarchically organized file system after a snapshot has been created in one embodiment. To create the snapshot, the snapshot system created a new node 6 and incremented the snapshot identifier of node 0 to 1. The snapshot system copied the data of root node 0 to the root node 6 of the snapshot. As a result, node 6 points to the same child nodes as node 0. In addition, the snapshot system set the snapshot identifier field of node 6 to 1. The snapshot system also sets the previous and next fields. The previous field of node 0 points to node 6, and the next field of node 6 points to node 0.

Figure 6:
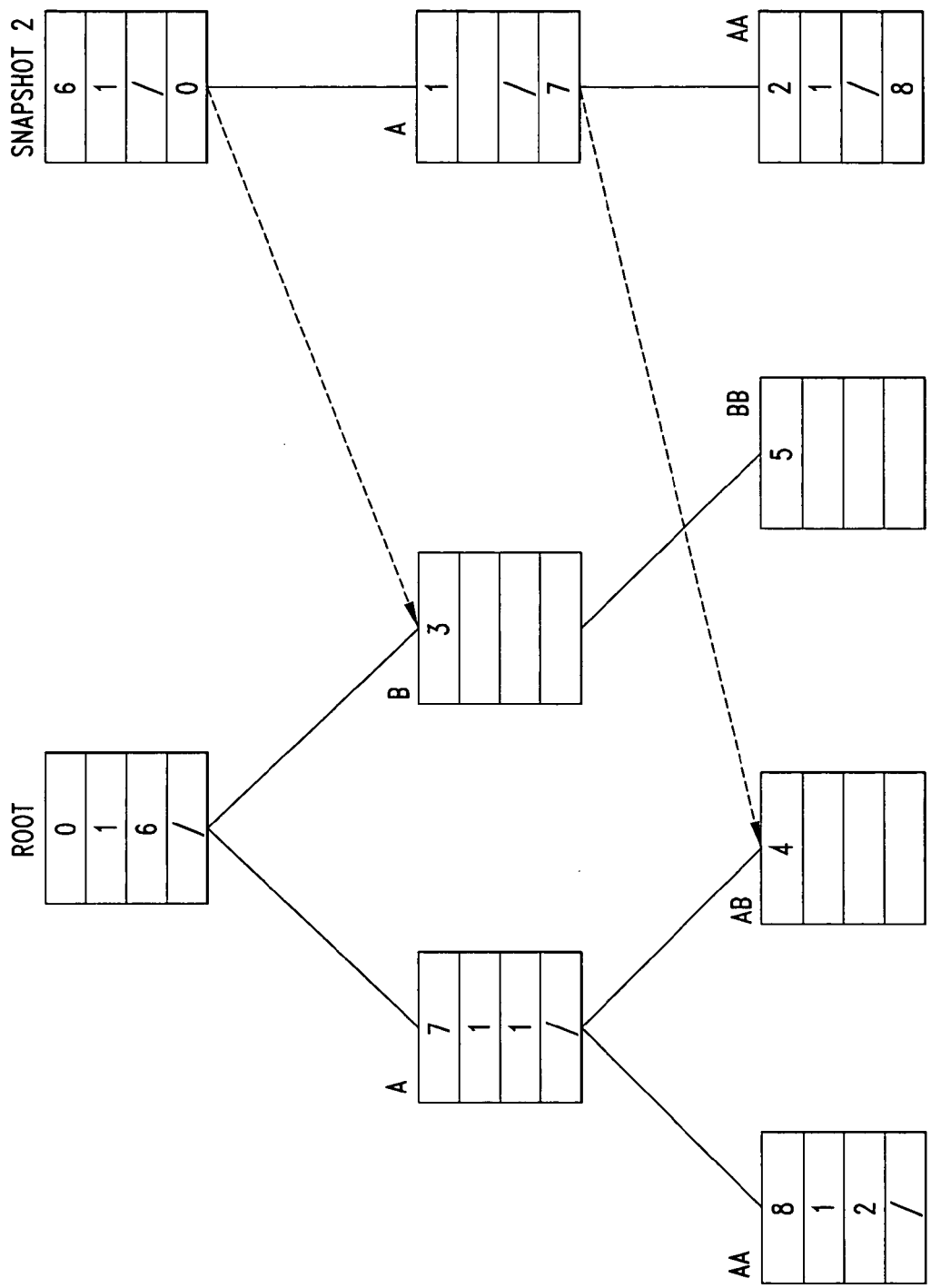
FIG. 6 is a block diagram illustrating data within the hierarchically organized file system after node 2 was modified in one embodiment.

FIG. 6 is a block diagram illustrating data within the hierarchically organized file system after node 2 was modified in one embodiment. When the snapshot system received an indication that node 2 was to be modified, it located the highest ancestor node in the hierarchy that had not yet been replaced during the current snapshot. In this case, the highest such ancestor node was a node 1. The snapshot system then created a new node identified as node 7. The snapshot system copied the data from node 1 to node 7, set the snapshot identifier of node 7 to 1, and set the previous field of node 7 to 1. The snapshot system also set the next field of node 1 to 7. The snapshot system then created a new node for the node being modified. The new node is identified as node 8. The snapshot system copied the data from node 2 to node 8. It also set the snapshot identifier field of node 8 to 2 and set the previous field of node 8 to 2. If node 2 was a file node, then the snapshot system created a copy of the file data for node 2 and then modified the file data of node 8. Alternatively, the snapshot system may leave node 2 pointing to the unmodified data and allocate new data blocks for node 8. Nodes 6, 1, and 2 are snapshot nodes that are part of snapshot 1, and the rest of the nodes are current nodes.

Figure 7:
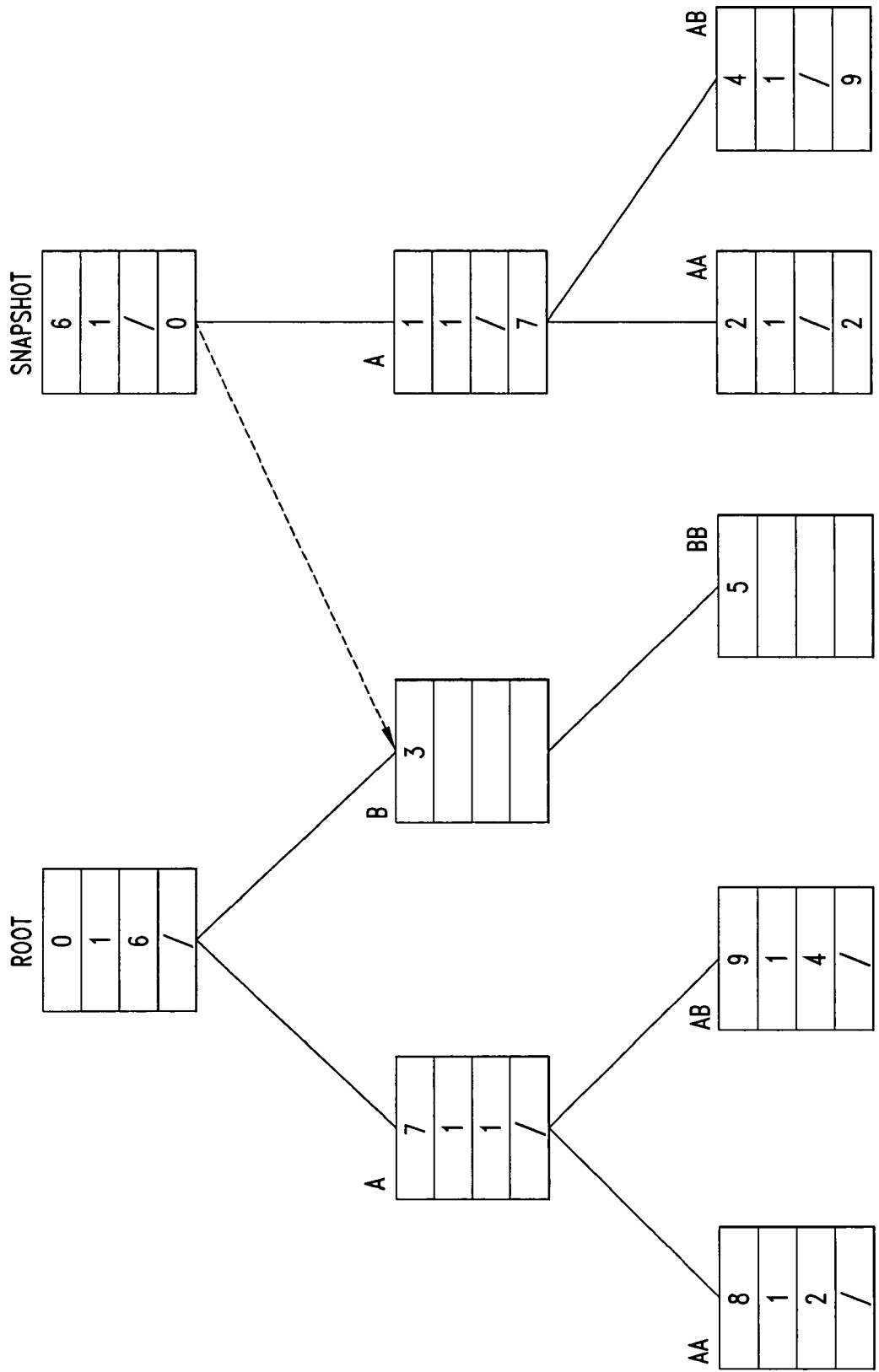
FIG. 7 is a block diagram illustrating data within the hierarchically organized file system after node 4 was modified in one embodiment.

FIG. 7 is a block diagram illustrating data within the hierarchically organized file system after node 4 was modified in one embodiment. When the snapshot system received an indication that node 4 was to be modified, it determined that all of its ancestor nodes had already been replaced in the current snapshot. In particular, its parent node 7 has the current snapshot identifier in its snapshot identifier field. As a result, the snapshot system created a new node for node 4, which is identified as node 9. The snapshot system then copies the data of node 4 to node 9 and set its fields in much the same way as was done when node 2 was modified. Nodes 6, 1, 2, and 4 are snapshot nodes that are part of snapshot 1, and the rest of the nodes are current nodes.

Figure 8:
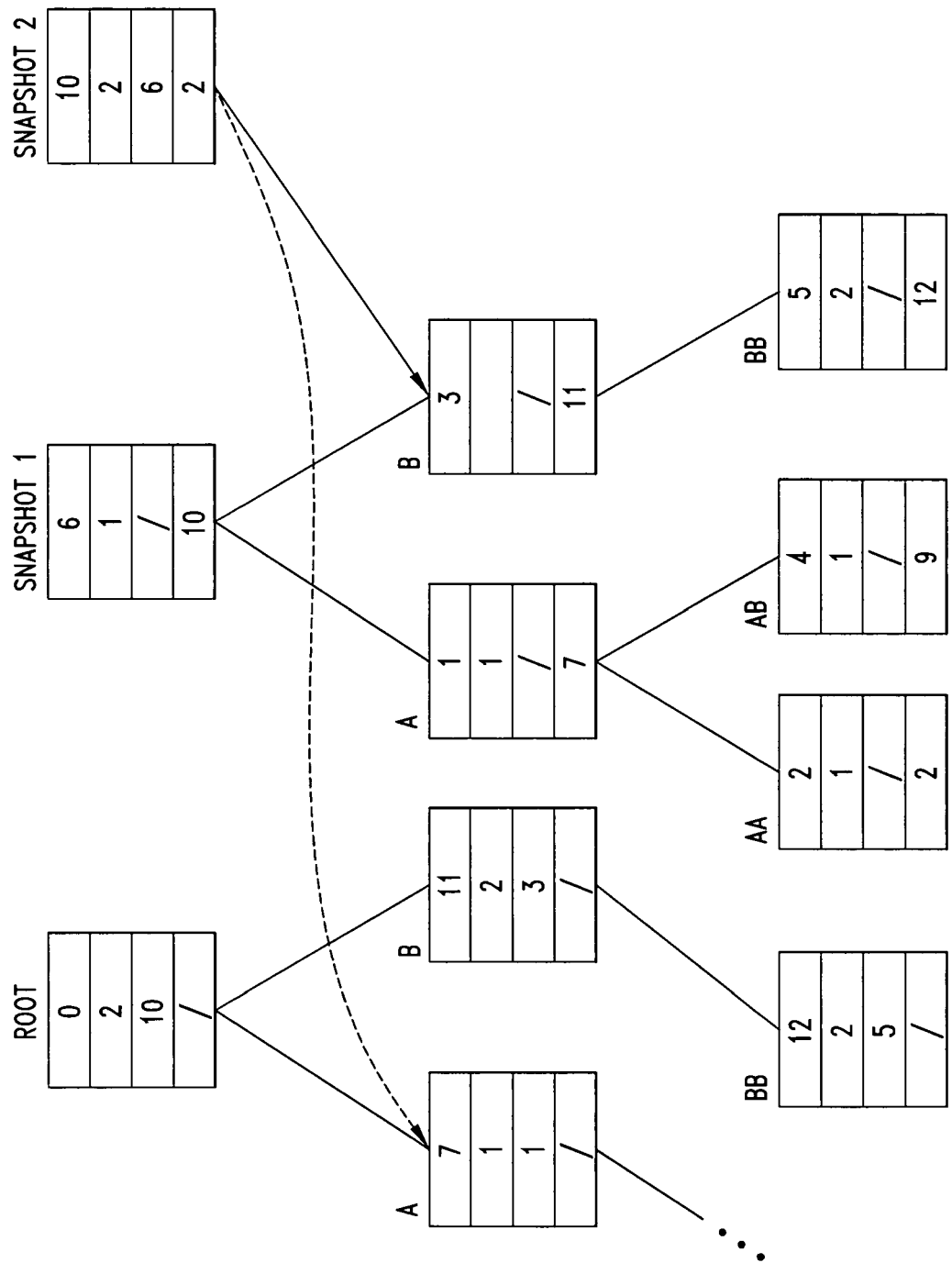
FIG. 8 is a block diagram illustrating data within the hierarchically organized file system after a second snapshot was created in one embodiment.

FIG. 8 is a block diagram illustrating data within the hierarchically organized file system after a second snapshot was created in one embodiment. To create the second snapshot, the snapshot system created a new node 10 and incremented the snapshot identifier to 2. The snapshot system then copied the data of root node 0 to the new root node 10. As a result, node 10 pointed to the same child nodes as node 0.

After snapshot 2 was created, the snapshot system received a request to modify node 5. The snapshot system determined that node 3 was the highest ancestor node that had not yet been replaced during snapshot 2. As a result, the snapshot system created a new node 11 to replace node 3 and new node 12 to replace node 5 in much the same way as done when node 2 of FIG. 6 was replaced.

Snapshots 1 and 2 can be accessed by traversing through their respective root nodes. In the example of FIG. 8, all the nodes of a snapshot 1 are snapshot nodes because all the current nodes at the time snapshot 1 was created have since been modified. Snapshot 2 points to some snapshot nodes and some current nodes that have not yet been modified since snapshot 2 was created. By traversing through the root nodes of the snapshots, all the data associated with that snapshot can be located whether the data be stored in a snapshot node or a current node. In addition, different snapshots can share the same snapshot nodes as illustrated by snapshots 1 and 2 sharing node 3.

In one embodiment, the snapshot system stores the mapping between virtual identifiers and actual identifiers in the nodes themselves. The virtual identifier of a node is stored in an "aliased as" field. The snapshot system also stores in an "aliased by" field of each node the actual identifier of the node whose virtual identifier is the same as the actual identifier of this node. The snapshot system provides the virtual identifier from the aliased as field when an application program requests a handle for a node. When the application program then uses the virtual identifier to identify the node to be accessed, the snapshot system retrieves the node whose actual identifier is the same as the virtual identifier and uses its aliased by field to identify the node that should actually be accessed. The snapshot system may use a reserved value (e.g., node identifier of "0") to indicate that the virtual identifier of a node is the same as its actual identifier. Alternatively, the virtual identifier can be set to the same value as the actual identifier. For example, when a newly created node is added to the current data without replacing an existing node, it can have its virtual identifier be the same as its actual identifier. When the snapshot system replaces a node, the replacing node can be a newly created node or an existing node that has been freed and reused by the file system. If the replacing node is an existing node, then the snapshot system needs to ensure that its aliased as and aliased by fields properly identify the nodes. When the replaced node has a virtual identifier that is the same as the actual identifier of the replacing node, then the snapshot system sets the virtual identifier of the replacing node to its actual identifier, which in one embodiment is indicated by storing a 0 in the aliased as field. When the replaced node has a virtual identifier that is not the same as its actual identifier (e.g., the aliased as field of the replaced node does not contain a 0), then the snapshot system set the virtual identifier of the replacing node to the virtual identifier of the replaced node. When the replaced node has a virtual identifier that is the same as its actual identifier (e.g., the aliased as field of the replaced node contains a 0) then the snapshot system sets the virtual identifier of the replacing node to the actual identifier of the replaced node. The snapshot system also sets the virtual identifier of a replaced node. When the virtual identifier of the replacing node is the same as the actual identifier of the replaced node, then the snapshot system sets the virtual identifier of the replaced node to its actual identifier. When the replacing node has a virtual identifier that is not the same as the actual identifier of the replaced node, then the snapshot system sets the virtual identifier of the replaced node to the virtual identifier of the replacing node. When the virtual identifier of the replacing node is the same as its actual identifier, then the snapshot system sets the virtual identifier of the replaced node to its actual identifier. The snapshot system also sets the aliased by fields of the nodes to reflect the updated aliased as fields of the nodes.

The following tables contains pseudo code illustrating the logic for setting the aliased as and aliased by fields in one embodiment. Table 1 represents the setting of the virtual identifier of the replacing node, and Table 2 represents the setting of the virtual identifier of the replaced node. The conditions represent values of the fields prior to any changes by the pseudo code. The aliased as field is represented as "as," and the aliased by field is represented as "by."

TABLE 1

```
if (replaced.as = replacing.id) then
   replacing.as = 0
   replacing.by = 0
else if (replaced.as <> 0)
   replaced.as->by = replacing.id
   replacing.as = replaced.as
else
   replaced.by = replacing.id
   replacing.as = replaced.id
endif
```

TABLE 2

```
if (replacing.as = replaced.id) then
   replaced.as = 0
   replaced.by = 0
else if (replacing.as <> 0)
   replacing.as->by = replaced.id
   replaced.as = replacing.as
else
   replacing.by = replaced.id
```

TABLE 2-continued

```
replaced.as = replacing.id
endif
```

Figure 9A:
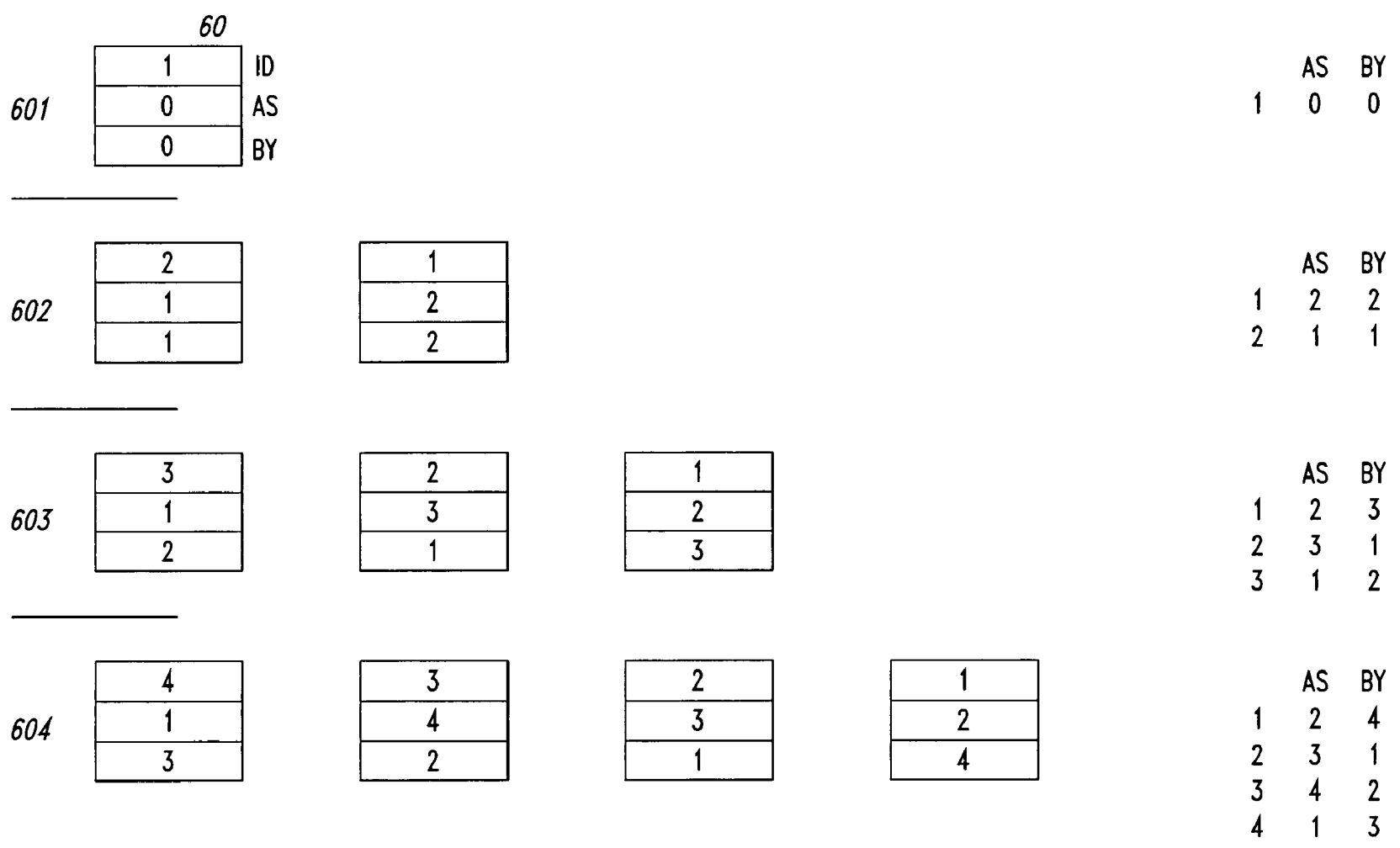

FIGS. 9A and 9B illustrate the setting of the aliased as and aliased by fields in one embodiment. Each square represents a node and contains the identifier, aliased as, and aliased by fields of the node. Line 601 illustrates current data that contains one node, node 1. The aliased as and aliased by fields contain 0 to indicate that the virtual identifier of node 1 is the same as its actual identifier. Line 2 illustrates that the snapshot system has replaced node 1 with node 2. Node 2 represents the current data. Node 2 has its aliased as field set to 1 so that whenever an application program accesses node 2, the snapshot system returns 1 as its virtual identifier. Node 1 has its aliased by field set to 2 so that, whenever the snapshot system receives a virtual identifier of 1, it accesses node 2. Line 603 illustrates that the snapshot system has replaced node 2 with node 3. Node 3 has its aliased as field set to 1 so that whenever an application program accesses node 3, the snapshot system returns 1 as its virtual identifier. Whenever node 2, which is now snapshot data, is accessed, the snapshot system returns 3 as its virtual identifier. When an application program accesses a node using the virtual identifier of 3, the snapshot system accesses node 3 and uses its aliased by field to determine that request should be to access node 2. Line 604 illustrates when node 4 replaces node 3. Line 605 illustrates when node 1 has been removed from the snapshot data and reused by the file system to add a new node to the current data. Nodes 1 and 4 are current data. Line 606 illustrates when node 2 has been reused to replace node 1. The snapshot system can now use the actual identifier of node 2 as its virtual identifier. Line 607 illustrates when node 3 is freed up and replaces node 4. The snapshot system can now use the actual identifier of node 4 as its virtual identifier. One skilled in the art will appreciate that the mapping of actual identifier to virtual identifies can be stored in a data structure separate from the nodes. In addition, one skilled in the art will appreciate that although the aliased by information can be derived from the aliased as information, it may improve speed of access to include the aliased by information.

Figure 10:
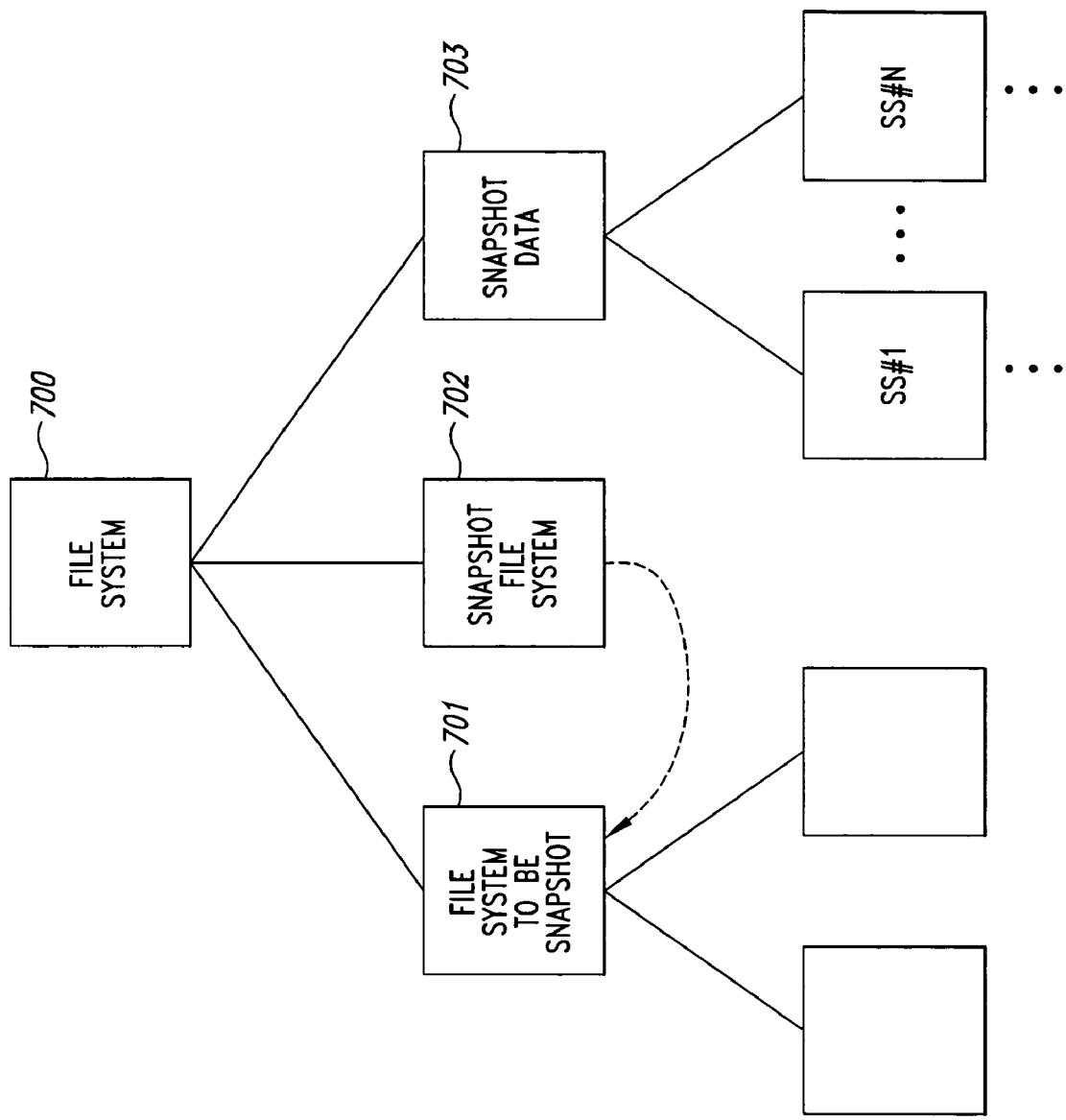
FIG. 10 is a block diagram illustrating the organization of the snapshot system in one embodiment.

FIG. 10 is a block diagram illustrating the organization of the snapshot system in one embodiment. In this example, the file system 700 has volumes 701, 702, and 703 mounted. File system 701 is the file system for which the snapshots are to be created. Snapshot file system 702 is a file system that effects the creating of snapshots. Requests to access file system 701 are sent through snapshot file system 702, which serves as a front end to file system 701. When the snapshot file system receives a request to create a snapshot or modify data in the file system, it replaces the nodes of the file system 701 as appropriate. The snapshot file system stores the snapshot nodes in the snapshot data 703. The snapshot data 703 may contain a directory for each snapshot. That directory may contain identifying information related to the snapshot, timing information, and a reference to the root node of that snapshot. The snapshot file system 702, after performing the appropriate snapshot-related processing (e.g., mapping virtual identifiers to actual identifiers), forwards the access request to the file system 701 to update the current nodes.

The snapshot system may be implemented on a computer system that may include a central processing unit, memory, input devices (e.g., keyboard and pointing devices), output devices (e.g., display devices), and storage devices (e.g., disk drives). The memory and storage devices are computer-readable media that may contain instructions that implement the snapshot system. In addition, the data structures and message structures may be stored or transmitted via a data transmission medium, such as a signal on a communications link. Various communications links may be used, such as the Internet, a local area network, a wide area network, or a point-to-point dial-up connection. The snapshot system may be implemented as part of an existing file system or implemented as a front end to a file system. The snapshot system may take snapshots of the distributed file systems or any scheme for hierarchically organizing data.

Figure 11:
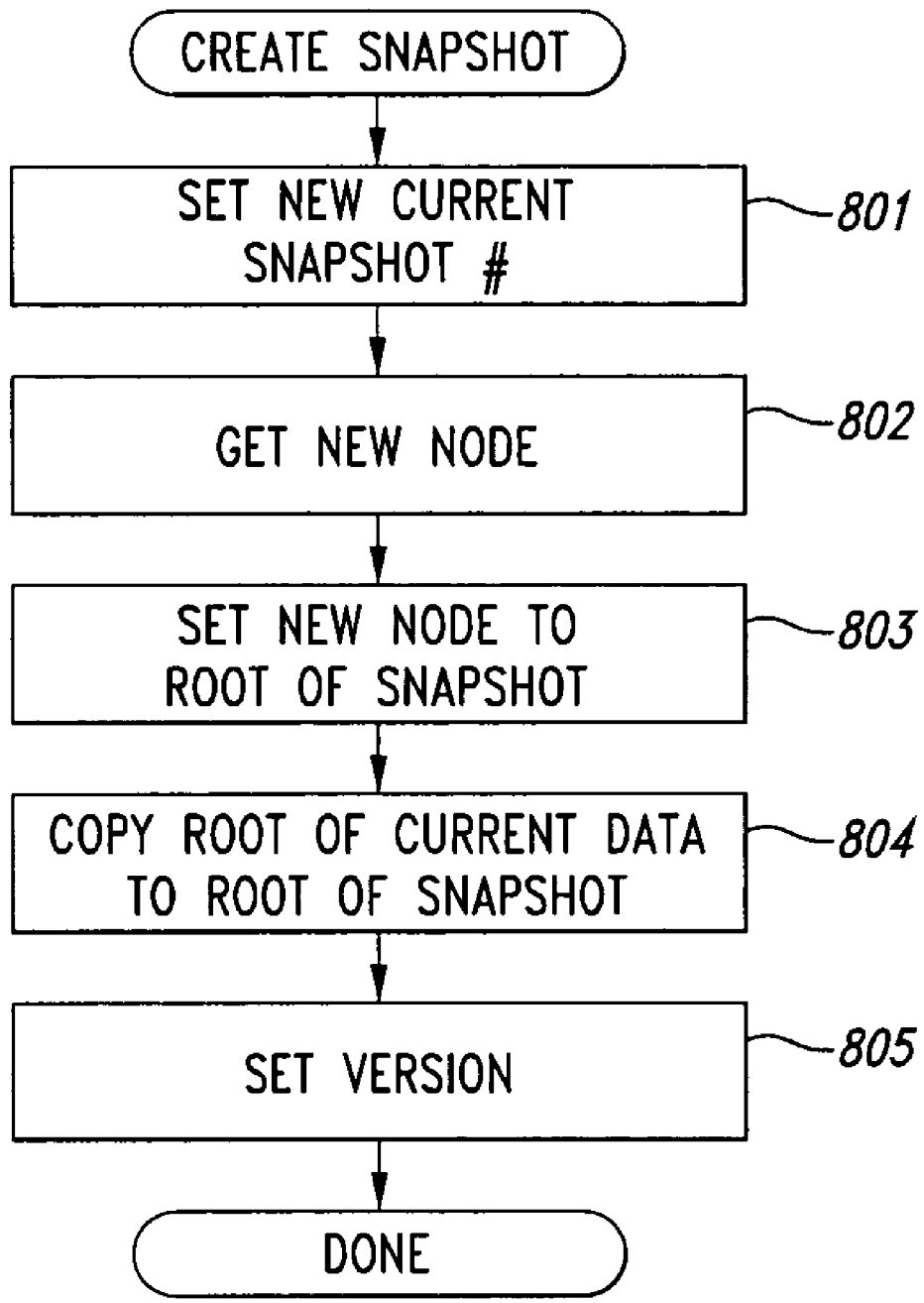
FIG. 11 is a flow diagram illustrating the processing of a create snapshot component of the snapshot system in one embodiment.

FIG. 11 is a flow diagram illustrating the processing of a create snapshot component of the snapshot system in one embodiment. In block 801, the component sets the new current snapshot identifier. In block 802, the component gets a new node to serve as the root node of the snapshot. In block 803, the component sets the new node to be the root node of the snapshot. In block 804, the component copies the data of the root node of the current data to the root node of the snapshot. In block 805, the component sets the version data (i.e., previous and next fields) and then completes.

Figure 12:
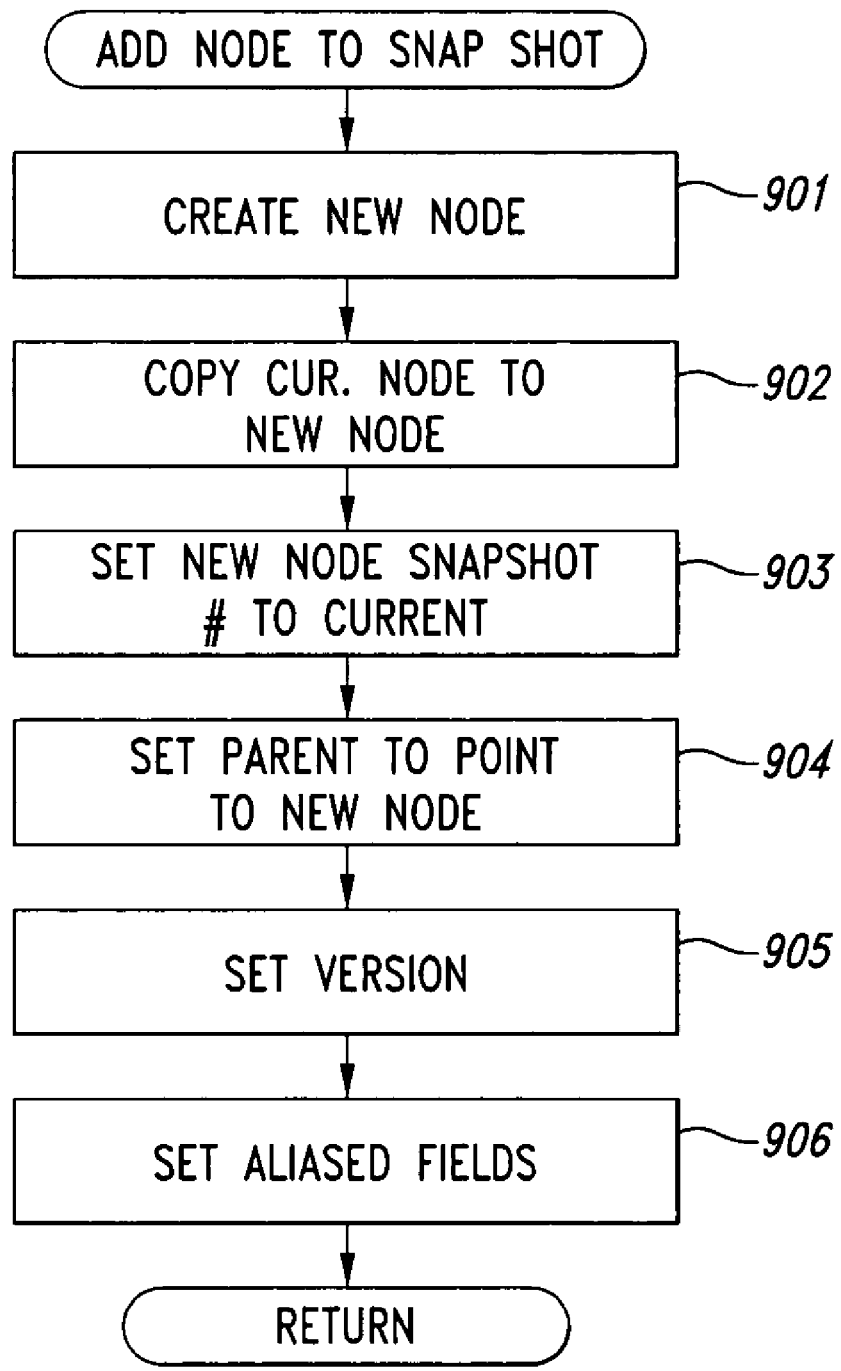
FIG. 12 is a flow diagram illustrating the processing of a component that adds a node to a snapshot in one embodiment.

FIG. 12 is a flow diagram illustrating the processing of a component that adds a node to a snapshot in one embodiment. In block 901, the component creates the replacing node. In block 902, the component copies the data of the replaced node to the replacing node. In block 903, the component sets the snapshot identifier field of the replacing node to the current snapshot identifier. In block 904, the component sets the parent, if any, of the replaced node to point to the replacing node. In block 905, the component sets the chain of versions for the nodes. In block 906, the component sets the aliased fields. The component then completes.

Figure 13:
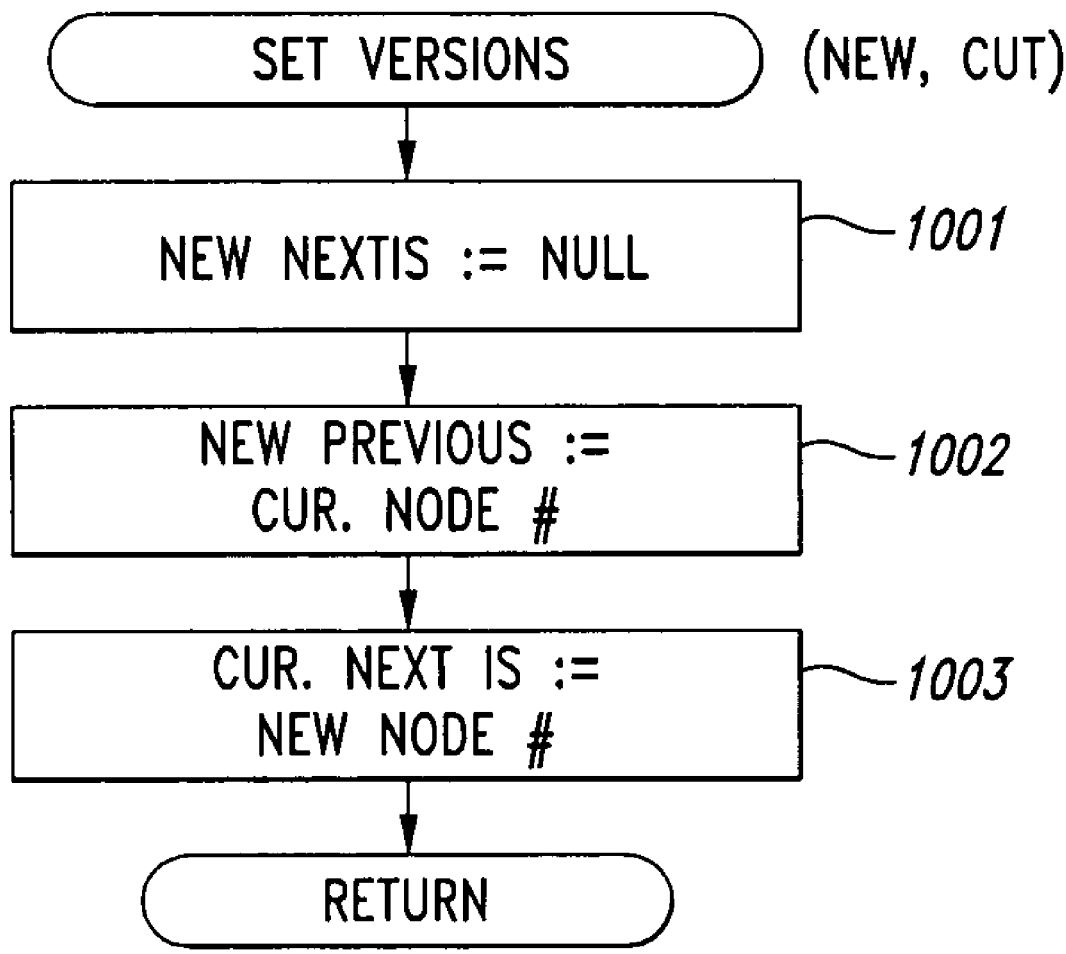
FIG. 13 is a flow diagram illustrating the processing of the set versions component in one embodiment.

FIG. 13 is a flow diagram illustrating the processing of the set versions component in one embodiment. The component is passed the node identifier of the new and current nodes. In block 1001, component sets the next field of the new node to null. In block 1002, the component sets the previous field of the new node to the node identifier of the current node. In block 1003, the component sets at the next field of the current node to the node identifier of the new node and then returns.

Figure 14:
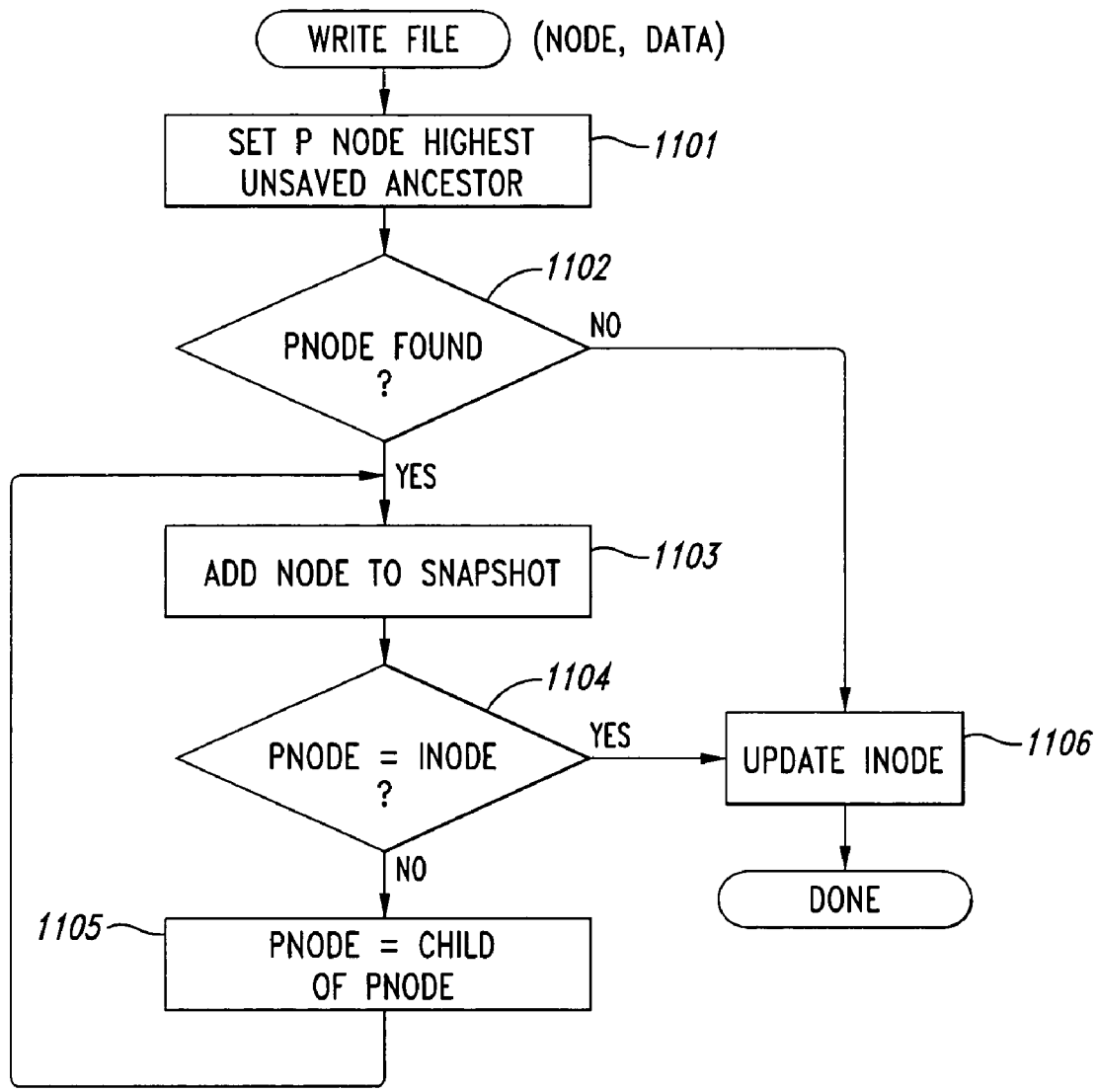
FIG. 14 is a flow diagram illustrating the processing of a component to write to a file in one embodiment.

FIG. 14 is a flow diagram illustrating the processing of a component to write to a file in one embodiment. The component is passed an indication of the node to which the passed data is to be written. In block 1101, the component identifies the highest ancestor node that has not yet been replaced during the current snapshot. In decision block 1102, if such an ancestor node has been found or the node itself has not yet been replaced during the current snapshot, then the component continues at block 1103, else the component continues at block 1106. In block 1103–1105, the component loops replacing ancestor nodes and the node itself. In block 1103, the component invokes the add node to snapshot component passing the currently pointed to ancestor node. In decision block 1104, if the currently pointed to ancestor node is the node itself, then the component continues at block 1106, else the component continues at block 1105. In block 1105, the component sets the current ancestor node to the child of the previous current ancestor node and loops to block 1103. In block 1106, the component updates the file data for the current node and then completes.

One skilled in the art will appreciate that although specific implementations of the block level snapshot system have been described herein for purposes of illustration, various modifications may be made without deviating from the spirit and scope of the invention. For example, the snapshot system can be used with virtually any file system, including UNIX-based file system and file systems developed by Microsoft, IBM, EMC, and so on. Accordingly, the invention is not limited except as by the appended claims.

The invention claimed is:

1. A system comprising:
   an initiator including:
      a collection of files, each of the files containing data apportioned into blocks of data;
      a first block level hardware interface;
      a first block level communication interface configured to transmit and receive the blocks of data via the first block level hardware interface;
   a storage containing data segregated into nodes; and
   a snapshot server including:
      a node level hardware interface communicatively linked with the storage;
      a second block level hardware interface communicatively linked to the first block level hardware interface of the initiator;
      a second block level communication interface configured to exchange blocks of data with the initiator via the second block level hardware interface;
      a node level snapshot management configured to generate snapshots of the nodes of data contained in the storage; and
      an agent associated with the collection of files, the agent configured to translate first blocks of data received from the initiator into corresponding first nodes of data to be sent via the node level hardware interface to the storage, the agent configured to translate second nodes of data received from the storage into corresponding second blocks of data to be sent to the initiator.

2. The system of claim 1 wherein the collection of files is indicated on the initiator by one of the following: a drive letter and a directory name.

3. The system of claim 1 wherein the agent is configured to convert SCSI formatted offset address associated with at least one of the first blocks of data into a terabyte/gigabyte/megabyte/sub-megabyte address of the storage associated with at least one of the first nodes of data to be sent to the storage as part of the translation of the first blocks of data into the corresponding first nodes of data.

4. The system of claim 1 wherein the initiator is a workstation.

5. The system of claim 1 wherein the first and second block level hardware interfaces are compliant with SCSI standards and the node level hardware interface is compliant with IDE standards.

6. The system of claim 1 wherein the initiator is configured to use data block sizes of 512 kilobytes.

7. The system of claim 1 wherein the agent is further configured to determine a location in the storage where to send the first nodes of data from a write command received from the initiator along with the first blocks of data.

8. The system of claim 1 wherein the agent is further configured to determine an origination location in the storage of the second nodes of data from a read command received from the initiator, and wherein the agent is configured to request from the storage transmission of the second nodes of data.

9. A system comprising:
   an initiator having a file containing data apportioned into blocks of data;
   a storage containing data segregated into nodes; and
   a snapshot server communicatively link to the initiator and the storage, the snapshot server including a node level snapshot management configured to generate snapshots of the nodes of data contained in the storage and an agent configured to translate the blocks of data received from the initiator into corresponding nodes of data to be sent to the storage, the agent configured to translate nodes of data received from the storage into corresponding blocks of data to be sent to the initiator.

10. A system comprising:
    a first initiator configured to access a first collection of files, each file containing data apportioned into a collection of blocks of data;
    a second initiator configured to access a second collection of files, each file containing data apportioned into a collection of blocks of data;
    a storage containing data segregated into a first collection of nodes corresponding to the first collection of files and into a second collection of nodes corresponding to the second collection of files; and
    a snapshot server communicatively linked with the first initiator, the second initiator and the storage, the snapshot server including:
       a node level snapshot management configured to generate node snapshots of the nodes of data contained in the storage, the node snapshots being stored in the storage;
       a first agent corresponding to the first initiator configured to translate one or more of the blocks of data when received from the first initiator by the snapshot server into associated nodes of data to be sent to the storage, the first agent configured to request nodes of data from storage corresponding to a request from the first initiator for blocks of data and to translate nodes of data received from the storage into the requested blocks of data to be sent to the first initiator; and
       a second agent corresponding to the second initiator configured to translate one or more of the blocks of data when received from the second initiator by the snapshot server into associated nodes of data to be sent to the storage, the second agent configured to request nodes of date from storage data corresponding to a request from the second initiator for blocks of data and to translate nodes of data received from the storage into the requested blocks of data to be sent to the second initiator.

11. A system comprising:
    a server;
    a first block level communication;
    a plurality of initiators link to the server through the first block level communication;
    a second block level communication;
    a storage, the server linked to the storage through the second block level communication, the storage having an initial physical storage capacity;
    a plurality of agents running on the storage, each the plurality of agents configured to direct data commands from one of the plurality of initiators to the storage, each of the plurality of agents coded to indicate capacity allocation to be used to respond to queries from the plurality of initiators regarding total storage available to the querying initiator, the sum of the capacity allocations as designated being a total capacity allocation larger in size than the initial physical storage capacity of the storage; and a monitor running on the server configured to monitor the storage for total amount of physical space on the storage being used by at least one of the plurality of initiators, the monitor configured to generate an alert when the total amount of physical space on the storage being used by at least one of the plurality of initiators reaches a predetermined fraction of the total amount of physical space available on the storage.

12. A system comprising:
an initiator having a first file indicator associated with a first collection of files and a second file indicator associated with a second collection of files, each file containing data apportioned into blocks of data;
a storage containing data segregated into nodes; and
a snapshot server communicatively linked with the initiator and the storage, the snapshot server including:
a node level snapshot management configured to generate snapshots of the nodes of data contained in the storage;
a first agent corresponding to the first file indicator configured to translate one or more blocks of data associated with the first collection of files into corresponding nodes of data to be sent to the storage, the first agent configured to request nodes of data from storage corresponding to a request from the initiator for blocks of data associated with the first collection of files and to translate nodes of data received from the storage into the requested blocks of data to be sent to the initiator; and
a second agent corresponding to the second file indicator configured to translate one or more blocks of data associated with the second collection of files into corresponding nodes of data to be sent to the storage, the second agent configured to request nodes of data from storage corresponding to a request from the initiator for blocks of data associated with the second collection of files and to translate nodes of data received from the storage into the requested blocks of data to be sent to the initiator.

13. The system of claim 12 wherein the first agent is further configured to respond to a query from the first initiator that space available on the storage is a first size, wherein the second agent is further configured to respond to a query from the second initiator that space available on the storage is a second size, the sum of the first and second size and other sizes associated with responses by other agents running on the snapshot server to queries by other initiators being larger than the physical size of the storage, the snapshot server further including a storage monitor configured to generate an alert once a predetermine amount of storage has been used.

14. A method comprising:
in a memory of an initiator, storing an indicator of a collection of files, each of the files containing data apportioned into blocks of data;
linking the initiator with a node level snapshot server using a first block level communication;
linking the snapshot server with a storage using a second block level communication;
in the snapshot server translating blocks of data received from the initiator into corresponding nodes of data to be sent to the storage; and
generating a snapshot of at least one of the nodes of data contained in the storage.

15. The method of claim 14 wherein storing in memory stores the indicator as one of the following: a drive letter and a directory name.

16. The method of claim 14 further including in the snapshot server, determining location in the storage where to send the nodes of data from a write command received from the initiator along with the blocks of data.

17. The method of claim 14 wherein the translating includes converting SCSI formatted offset address associated with at least one of the blocks of data into a terabyte/gigabyte/megabyte/sub-megabyte address of the storage associated with at least one of the nodes of data to be sent to the storage as part of the translation of the blocks of data into the corresponding nodes of data.

18. The method of claim 14 wherein generating a snapshot of at least one of the nodes of data includes:
copying a first node having child nodes to a new node that points to the child nodes of the first node; and
when a node is modified to generate a modified node:
replacing ancestor nodes of the modified node that have not yet been replaced with a new node;
replacing the modified node with a new node that points to the same child nodes of the replaced node; and
effecting the modification on the new node.

19. A method comprising:
in memory of an initiator storing an indicator of collection of files, each of the files containing data apportioned into blocks of data;
linking the initiator with a node level snapshot server using a first block level communication;
linking the snapshot server with a storage using a second block level communication;
in memory of the snapshot server, translating nodes of data received from the storage into corresponding blocks of data to be sent to the initiator; and
generating a snapshot for at least one of the nodes of data contained in the storage.

20. The method of claim 17 further including in the snapshot server, determining an origination location in the storage of the nodes of data from a read command received from the initiator and from the snapshot server, requesting from storage, transmission of the nodes of data.

21. A method comprising:
linking a first initiator having a first root directory to a snapshot server through a first block level communication;
linking a second initiator having a second root directory to the snapshot server through a second block level communication;
linking a storage to the snapshot server through a third block level communication;
through a first agent process running on the snapshot server, pointing the first root directory to a first collection of nodes stored on the storage so that all nodes of the first collection of nodes are pointed at with a pointer from at least one of the first root directory and another of the first collection of nodes;
generating a first snapshot of the first collection of nodes;
through a second agent process running on the snapshot server, pointing the second root directory to the first snapshot so that all nodes of the first snapshot are pointed at with a pointer from at least one of the second root directory and another node of the first snapshot;
generating a second snapshot of the first snapshot;
modifying the second root directory on the second initiator to consequently modify the first snapshot.

22. The method of claim 21 further comprising:
detecting at least one node of the first snapshot having no pointer pointing at the at least one node; and upon detection, reallocating storage space of the storage used for the at least one node as unused space.

23. A method comprising:

linking a plurality of initiators to a server through a first block level communication;

linking the server to a storage through a second block level communication, the storage having an initial physical storage capacity;

directing data commands from each of the plurality of initiators through one of a plurality of agents running on the server to the storage;

coding in each of the plurality of agents a designation indicating capacity allocation to be used to respond to queries from the plurality of initiators regarding total storage available to the querying initiator, the sum of the capacity allocations as designated being a total capacity allocation larger in size than the initial physical storage capacity of the storage;

monitoring the storage for total amount of physical space on the storage being used by at least one of the plurality of initiators; and generating an alert when the total amount of physical space on the storage being used by at least one of the plurality of initiators reaches a predetermined fraction of the total amount of physical space available on the storage.

24. The method of claim 23 further comprising adding additional physical storage space to the storage in response to the generating an alert.

* * * * *